United States Patent
Pletka et al.

(10) Patent No.: US 11,182,089 B2
(45) Date of Patent: Nov. 23, 2021

(54) ADAPTING MEMORY BLOCK POOL SIZES USING HYBRID CONTROLLERS

(71) Applicant: International Business Machines Corporation, Armonk, NY (US)

(72) Inventors: Roman Alexander Pletka, Uster (CH); Radu Ioan Stoica, Zurich (CH); Sasa Tomic, Kilchberg (CH); Nikolaos Papandreou, Thalwil (CH); Nikolas Ioannou, Zurich (CH); Aaron Daniel Fry, Richmond, TX (US); Timothy Fisher, Cypress, TX (US); Charalampos Pozidis, Thalwil (CH); Andrew D. Walls, San Jose, CA (US)

(73) Assignee: International Business Machines.Corporation, Armonk, NY (US)

( * ) Notice: Subject to any disclaimer, the term of this patent is extended or adjusted under 35 U.S.C. 154(b) by 0 days.

(21) Appl. No.: 16/459,393

(22) Filed: Jul. 1, 2019

(65) Prior Publication Data
US 2021/0004158 A1 Jan. 7, 2021

(51) Int. Cl.
*G06F 3/06* (2006.01)
*G06F 12/02* (2006.01)

(52) U.S. Cl.
CPC .............. *G06F 3/064* (2013.01); *G06F 3/061* (2013.01); *G06F 3/0643* (2013.01);
(Continued)

(58) Field of Classification Search
CPC .................................................. G06F 12/0246
See application file for complete search history.

(56) References Cited

U.S. PATENT DOCUMENTS

| 7,865,658 B2 | 1/2011 | Lasser et al. |
| 7,948,798 B1 | 5/2011 | Sheredy et al. |

(Continued)

FOREIGN PATENT DOCUMENTS

WO 2016069031 A1 5/2016

OTHER PUBLICATIONS

Yang et al., "Utilization-Aware Self-Tuning Design for TLC Flash Storage Devices," IEEE Transactions on Very Large Scale Integration (VLSI) Systems, vol. 24, No. 10, Oct. 2016, pp. 3132-3144.

(Continued)

*Primary Examiner* — Edward J Dudek, Jr.
(74) *Attorney, Agent, or Firm* — Zilka-Kotab, P.C.

(57) ABSTRACT

A computer-implemented method, according to one embodiment, includes: determining whether a number of blocks included in a first ready-to-use (RTU) queue is in a first range of the first RTU queue. In response to determining that the number of blocks included in the first RTU queue is in the first range, a determination is made as to whether a number of blocks included in a second RTU queue is in a second range of the second RTU queue. Moreover, in response to determining that the number of blocks included in the second RTU queue is not in the second range, valid data is relocated from one of the blocks in a first pool which corresponds to the first RTU queue. The block in the first pool is erased, and transferred from the first pool to the second RTU queue which corresponds to a second pool.

20 Claims, 13 Drawing Sheets

(52) U.S. Cl.
CPC .......... *G06F 3/0647* (2013.01); *G06F 3/0688* (2013.01); *G06F 12/0246* (2013.01)

(56) References Cited

U.S. PATENT DOCUMENTS

| | | | |
|---|---|---|---|
| 8,312,219 B2 | 11/2012 | Cher et al. | |
| 8,407,400 B2 | 3/2013 | Marotta et al. | |
| 8,694,754 B2 | 4/2014 | Schuette et al. | |
| 8,943,261 B2 | 1/2015 | Koradhanyamath et al. | |
| 9,176,862 B2 | 11/2015 | Chen et al. | |
| 9,558,107 B2 | 1/2017 | Camp et al. | |
| 2008/0104353 A1* | 5/2008 | Madisetti | G06F 12/023 711/170 |
| 2008/0162863 A1* | 7/2008 | McClure | G06F 9/5016 711/171 |
| 2010/0172179 A1 | 7/2010 | Gorobets et al. | |
| 2011/0271043 A1* | 11/2011 | Segal | G06F 12/0246 711/103 |
| 2015/0058530 A1* | 2/2015 | Reddy | G06F 3/064 711/103 |
| 2016/0098213 A1* | 4/2016 | Franceschini | G06F 3/064 711/103 |
| 2018/0165021 A1* | 6/2018 | Tomic | G06F 3/061 |
| 2018/0211708 A1* | 7/2018 | Igahara | G06F 3/0679 |
| 2019/0065080 A1 | 2/2019 | Tanpairoj et al. | |
| 2020/0042223 A1* | 2/2020 | Li | G06F 12/0246 |

OTHER PUBLICATIONS

Park et al., "A hybrid flash translation layer design for SLC-MLC flash memory based multibank solid state disk," Microprocessors and Microsystems, Issue 35, 2011, pp. 48-59.

Pletka et al., U.S. Appl. No. 16/459,408, filed Jul. 1, 2019.

Li et al., "A New Hybrid SSD Architecture based on SLC and MLC," Applied Mechanics and Materials, vol. 541-542, Mar. 12, 2014, pp. 474-477.

Jimenez et al., "Libra: Software-Controlled Cell Bit-Density to Balance Wear in NAND Flash," ACM Transactions on Embedded Computing Systems, vol. 14, No. 2, Article 28, Feb. 2015, pp. 28:1-28:22.

Kim et al., "CRIM: Conditional Remapping to Improve the Reliability of Solid-State Drives with Minimizing Lifetime Loss," Scientific Programming, vol. 2018, Article ID 8171096, Sep. 20, 2018, pp. 1-10.

Pletka et al.,"Designing Enterprise Controllers with QLC 3D NAND," Powerpoint Presentation from Flash Memory Summit, 2018, pp. 1-13.

Chang, L., "A Hybrid Approach to NAND-Flash-Based Solid-State Disks," IEEE Transactions on Computers, vol. 59, No. 10, Oct. 2010, pp. 1337-1349.

Glen, D., "Optimized Client Computing With Dynamic Write Acceleration," Micron, 2014, pp. 1-5.

Vatto, K., "Samsung SSD 850 EVO (120GB, 250GB, 500GB & 1TB) Review," Anandtech, Dec. 8, 2014, 6 pages, retrieved from https://www.anandtech.com/show/8747/samsung-ssd-850-evo-review/2.

Pletka et al., "Health-Binning: Maximizing the Performance and the Endurance of Consumer-Level NAND Flash," ACM, SYSTOR '16, Jun. 6-8, 2016, 10 pages.

Im et al., "CombokFTL: Improving performance and lifespan of MLC flash memory using SLC flash buffer," Journal of Systems Architecture, Issue 56, 2010, pp. 641-653.

U.S. Appl. No. 16/439,122, filed Jun. 12, 2019.

Gudeta et al., "Probability-Based Static Wear-Leveling Algorithm for Block and Hybrid-Mapping NAND Fash Memory," Design Automation for Embedded Systems, Issue 16, 2012, pp. 241-264.

Anonymous, "A System and Method for Determining how to Optimally Pre-Stage Emergency and Service Vehicles," IP.com Prior Art Database, Technical Disclosure No. IPCOM000257321D, Jan. 31, 2019, 3 pages.

Pletka et al., "Management of Next-Generation NAND Flash to Achieve Enterprise-Level Endurance and Latency Targets," ACM Transactions on Storage, vol. 14, No. 4, Article 33, Dec. 2018, pp. 33:1-33:25.

Yim, K., "A Novel Memory Hierarchy for Flash Memory Based Storage Systems," Journal of Semiconductor Technology and Science, vol. 5, No. 4, Dec. 2005, pp. 262-269.

International Search Report and Written Opinion from PCT Application No. PCT/IB2020/055904, dated Oct. 10, 2020.

* cited by examiner

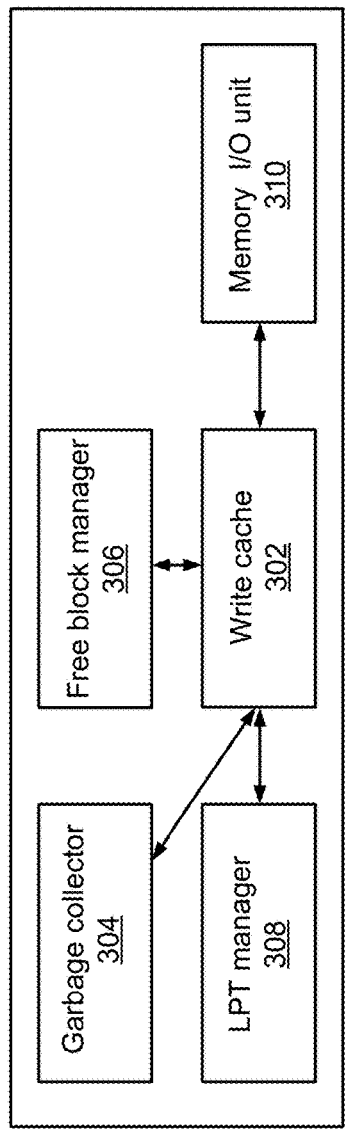
FIG. 3
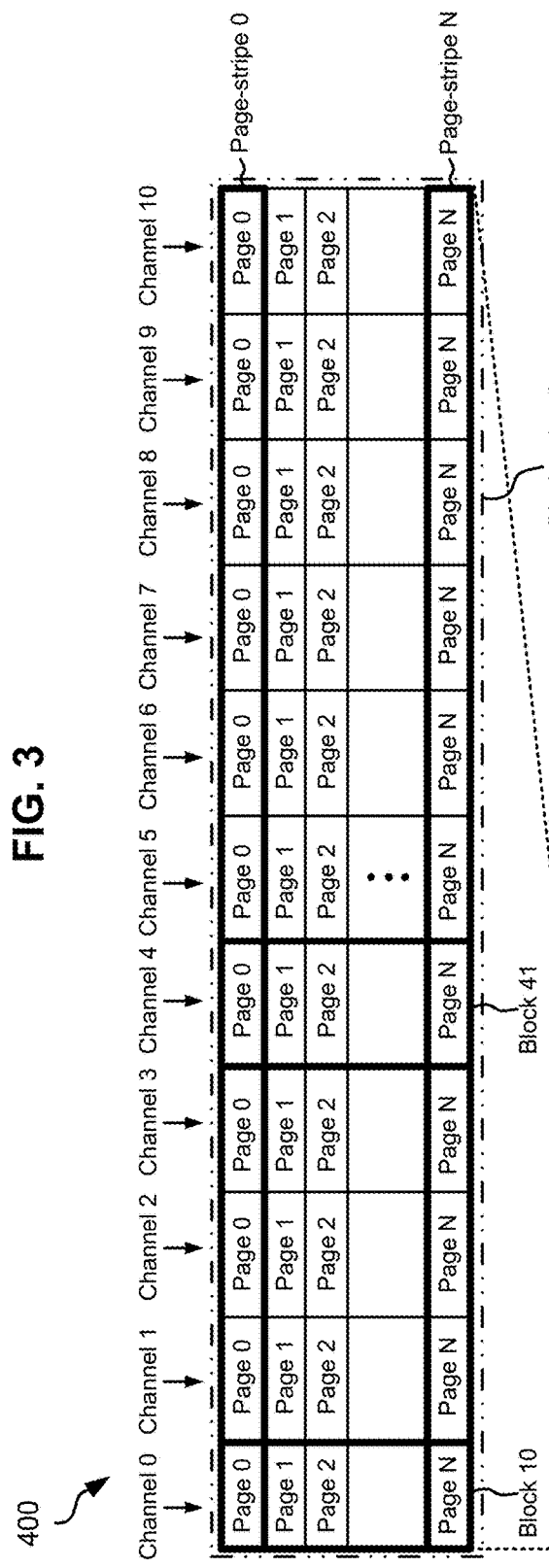
FIG. 4
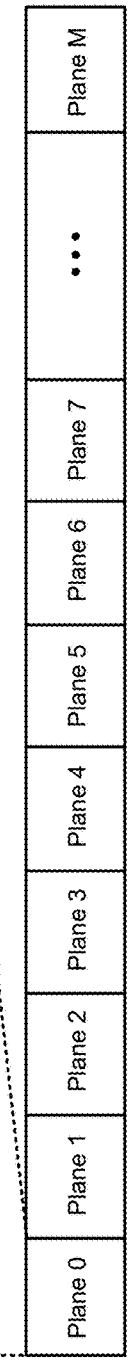

ADAPTING MEMORY BLOCK POOL SIZES USING HYBRID CONTROLLERS

BACKGROUND

The present invention relates to data storage systems, and more particularly, this invention relates to adjusting memory block pool sizes using hybrid controllers.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A computer-implemented method, according to one embodiment, is for adapting block pool sizes in a storage system. The computer-implemented method includes: determining whether a number of blocks included in a first ready-to-use (RTU) queue is in a first range of the first RTU queue. In response to determining that the number of blocks included in the first RTU queue is in the first range of the first RTU queue, a determination is made as to whether a number of blocks included in a second RTU queue is in a second range of the second RTU queue. Moreover, in response to determining that the number of blocks included in the second RTU queue is not in the second range of the second RTU queue, valid data is relocated from one of the blocks in a first pool which corresponds to the first RTU queue. The block in the first pool is erased, and transferred from the first pool to the second RTU queue which corresponds to a second pool. The blocks in the first pool are configured in single-level cell (SLC) mode, while the blocks in the second pool are configured in multi-bit-per-cell mode.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a plurality of non-volatile random access memory (NVRAM) blocks configured to store data. The system also includes a processor and logic integrated with and/or executable by the processor. The logic is configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
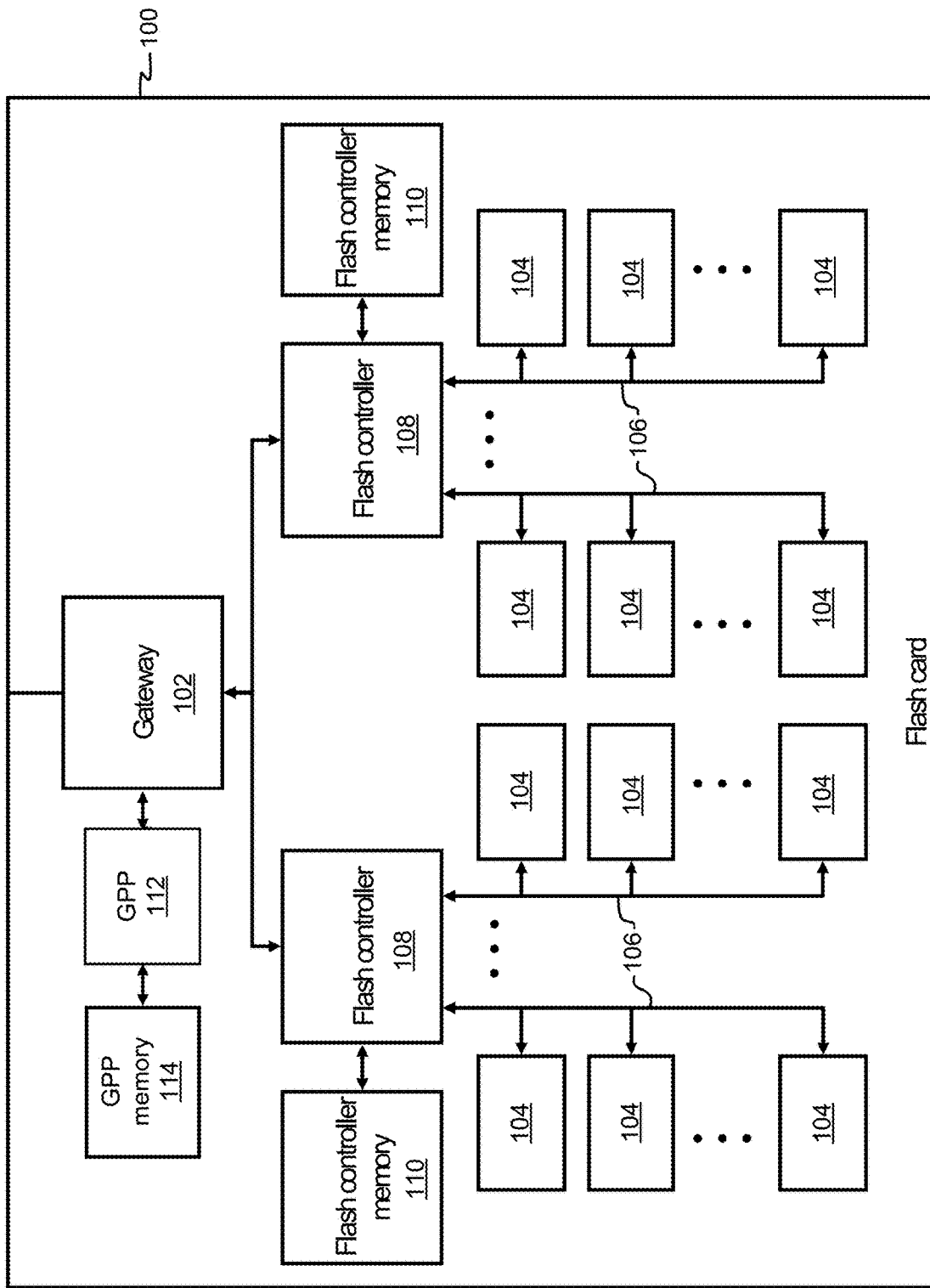
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is for adapting block pool sizes in a storage system. The computer-implemented method includes: determining whether a number of blocks included in a first ready-to-use (RTU) queue is in a first range of the first RTU queue. In response to determining that the number of blocks included in the first RTU queue is in the first range of the first RTU queue, a determination is made as to whether a number of blocks included in a second RTU queue is in a second range of the second RTU queue. Moreover, in response to determining that the number of blocks included in the second RTU queue is not in the second range of the second RTU queue, valid data is relocated from one of the blocks in a first pool which corresponds to the first RTU queue. The block in the first pool is erased, and transferred from the first pool to the second RTU queue which corresponds to a second pool. The blocks in the first pool are configured in single-level cell (SLC) mode, while the blocks in the second pool are configured in multi-bit-per-cell mode.

In another general embodiment, a computer program product includes a computer readable storage medium having program instructions embodied therewith. The program instructions are readable and/or executable by a processor to cause the processor to: perform the foregoing method.

In yet another general embodiment, a system includes: a plurality of non-volatile random access memory (NVRAM) blocks configured to store data. The system also includes a processor and logic integrated with and/or executable by the processor. The logic is configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
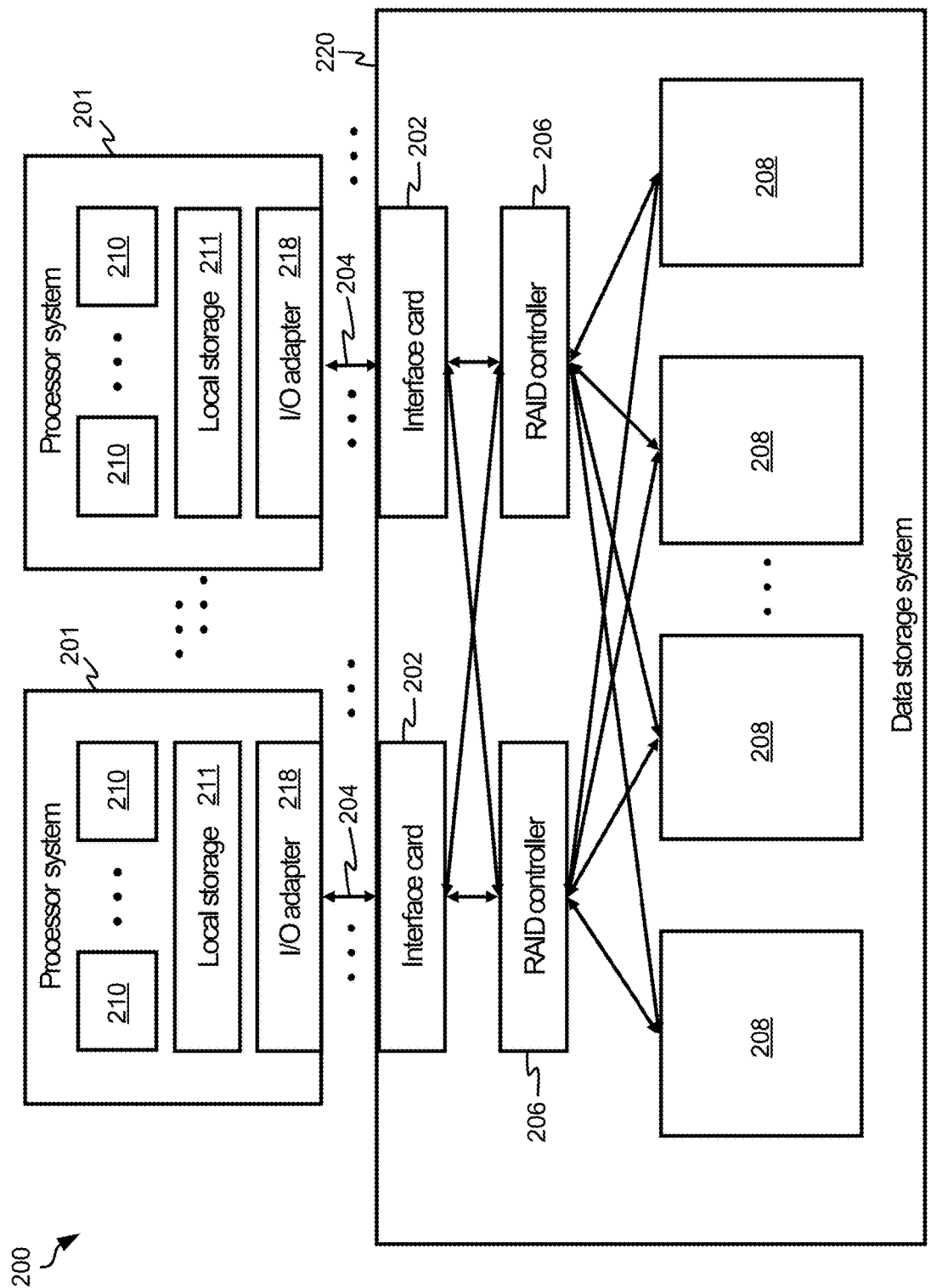
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108, GPP 112, and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) and/or GPP 112 may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing write heat separation.

Write Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for write heat separation when determining the write heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat separation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of write heat separation is two-fold. First, performing a garbage collection process on a hot memory block will prevent triggering the relocation of cold data as well. In the absence of write heat separation, updates to hot data, which are performed frequently, also results in the undesirable relocations of all cold data collocated on the same LEB as the hot data being relocated. Therefore, the write amplification incurred by performing garbage collection is much lower for embodiments implementing write heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing write heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened by associating one or more erased blocks to the LEB.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB or 16KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As alluded to above, physical configurations of memory blocks in non-volatile memory have changed over time. For instance, in the past Flash blocks had a single-bit-per-cell configuration, but improvements in data storage have introduced Flash blocks that implement multi-bit-per-cell configurations. While blocks having multi-bit-per-cell configurations are able to store more information than blocks having a single-bit-per-cell configuration, this increase in storage capacity comes at a price in terms of performance latency. For example, memory blocks having a single-bit-per-cell configuration experience write latencies that are from about 2.5 times to about 10 times lower than experienced by memory blocks having multi-bit-per-cell configurations. Similarly, memory blocks having a single-bit-per-cell configuration experience lower read latencies than memory blocks having multi-bit-per-cell configurations.

This tradeoff between storage capacity and performance latency allows for storage systems to tailor the performance capabilities of memory to some extent. For instance, a storage system predicted to have a high amount of I/O traffic is able to selectively include a greater number of memory blocks having a single-bit-per-cell configuration than those having multi-bit-per-cell configurations. Conversely, a storage system predicted to store a large amount of cold data is able to selectively include a greater number of memory blocks having multi-bit-per-cell configurations than those having a single-bit-per-cell configuration. However, real-time use often fluctuates from the predictions that may have been considered while designing these storage systems. As a result, conventional storage systems have been unable to maintain efficient performance.

In sharp contrast to the aforementioned shortcomings experienced by conventional systems, various ones of the embodiments included herein implement hybrid controllers which are able to dynamically adapt block pool sizes based on current utilization and workload properties, e.g., as will be described in further detail below.

Figure 5:
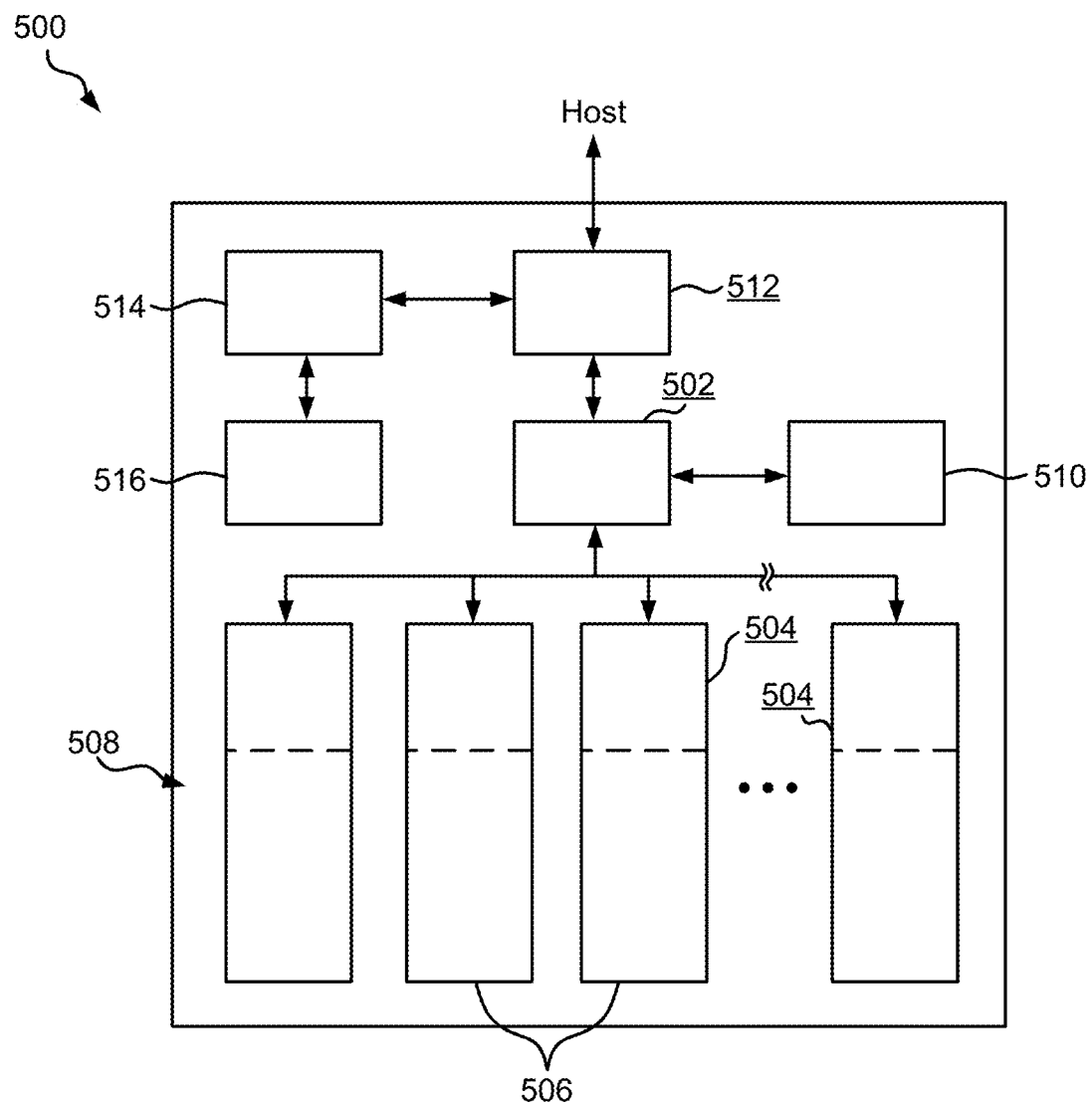
FIG. 5 is a representational view of a non-volatile memory module, in accordance with one embodiment.

Looking now to FIG. 5, a non-volatile memory module 500 having a hybrid controller 502 is illustrated in accordance with one embodiment. As an option, the present memory module 500 may be implemented in conjunction with features from any other embodiment listed herein, such as those described with reference to the other FIGS. However, such memory module 500 and others presented herein may be used in various applications and/or in permutations which may or may not be specifically described in the illustrative embodiments listed herein. Further, the memory module 500 presented herein may be used in any desired environment. Thus FIG. 5 (and the other FIGS.) may be deemed to include any possible permutation.

As noted above, the memory module 500 includes a hybrid controller 502 which is capable of managing and/or adapting blocks which are configured in single-bit-per-cell mode (also referred to herein as "single-level cell mode", or "SLC mode") as well as multi-bit-per-cell mode. According to some approaches, the hybrid controller 502 manages the different block configurations by splitting them into two different pools 504, 506. One of these pools 504 is designated as including those blocks which are configured in SLC mode, while the other pool 506 includes the blocks configured in multi-bit-per-cell mode.

Each of the pools 504, 506 extend across a number of data storage components (e.g., NVRAM memory modules such as NAND Flash memory devices) which together serve as a memory array 508. It follows that the various components illustrated in FIG. 5 function as a memory card and may implement any of the approaches described above with respect to memory card 100 of FIG. 1.

Referring still to FIG. 5, the hybrid controller 502 is also coupled to a cache memory 510 as well as a gateway 512 which receives data commands from one or more hosts, storage systems, running applications, etc. The gateway 512 is in turn coupled to a GPP 514 and GPP memory 516. As mentioned above, the GPP 514 may be of any desired type, e.g., such as an ASIC, FPGA, CPU, etc. Similarly, the GPP memory 516 may be of any desired type, e.g., such as RAM, ROM, battery-backed DRAM, phase-change memory PC-RAM, MRAM, STT-MRAM, etc., and/or combinations thereof.

It follows that the hybrid controller is able to store data that is frequently accessed (e.g., read, rewritten, appended to, etc.) in blocks that are configured in SLC mode and therefore included in the first pool 504, while data that is accessed less frequently is stored in blocks that are configured in multi-bit-per-cell mode and therefore included in the second pool 506. As a hybrid controller can be used to place user writes to blocks that are configured in SLC mode first, while only still valid data is destaged to multi-bit-per-cell blocks later in the background, thereby significantly reducing the number of writes operations performed on blocks in the second pool such that overall endurance is increased. This storage scheme achieves an efficient use of the different blocks of memory and their respective performance characteristics. However, as the ratio of hot and cold data stored in the memory module 500 fluctuates over time, each of the respective pools 504, 506 may be underutilized and/or overutilized.

Accordingly, the hybrid controller 502 is able to selectively reconfigure any of the blocks in the first and/or second pools 504, 506 to dynamically adapt based on actual utilization and/or workload properties. This allows for the memory module 500 to maintain efficient performance irrespective of the amount of hot or cold data stored therein. Looking now to FIG. 6A, a method 600 for adapting block pool sizes in a storage system is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions. For instance, the various processes included in method 600 are described below in the context of transitioning memory blocks configured in SLC mode to being configured in multi-bit-per-cell mode. However, any one or more of the various processes included in method 600 may be applied in the context of transitioning memory blocks configured in multi-bit-per-cell mode to being configured in SLC mode (e.g., see FIG. 6B below).

Each of the steps of the method 600 may be performed by any suitable component of the operating environment. For example, in various embodiments, the method 600 may be partially or entirely performed by a hybrid controller, a controller, a processor, a computer, etc., or some other device having one or more processors therein. Thus, in some embodiments, method 600 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Figure 6A:
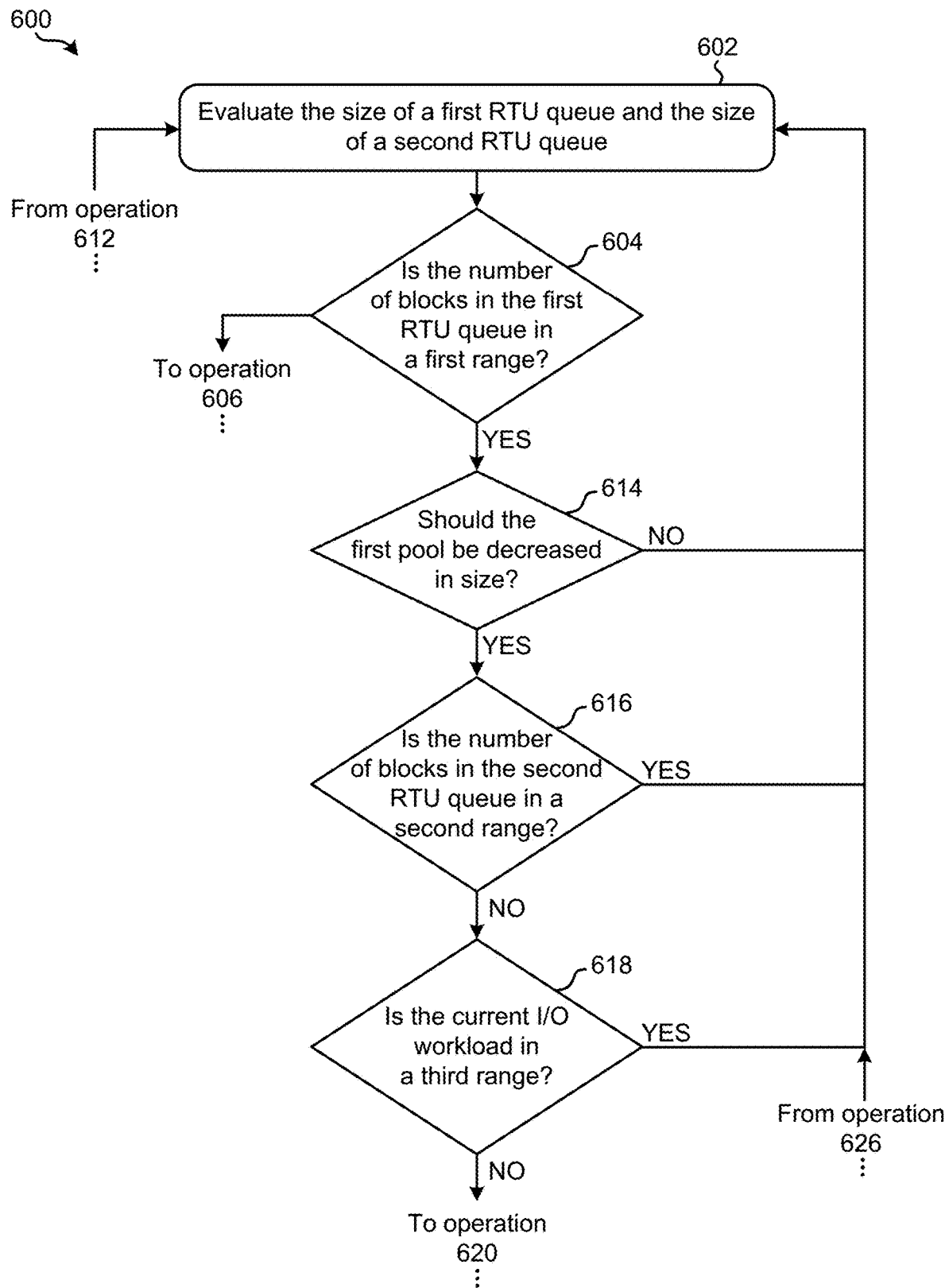
FIG. 6A is a flowchart of a method, in accordance with one embodiment.
Figure 6A:
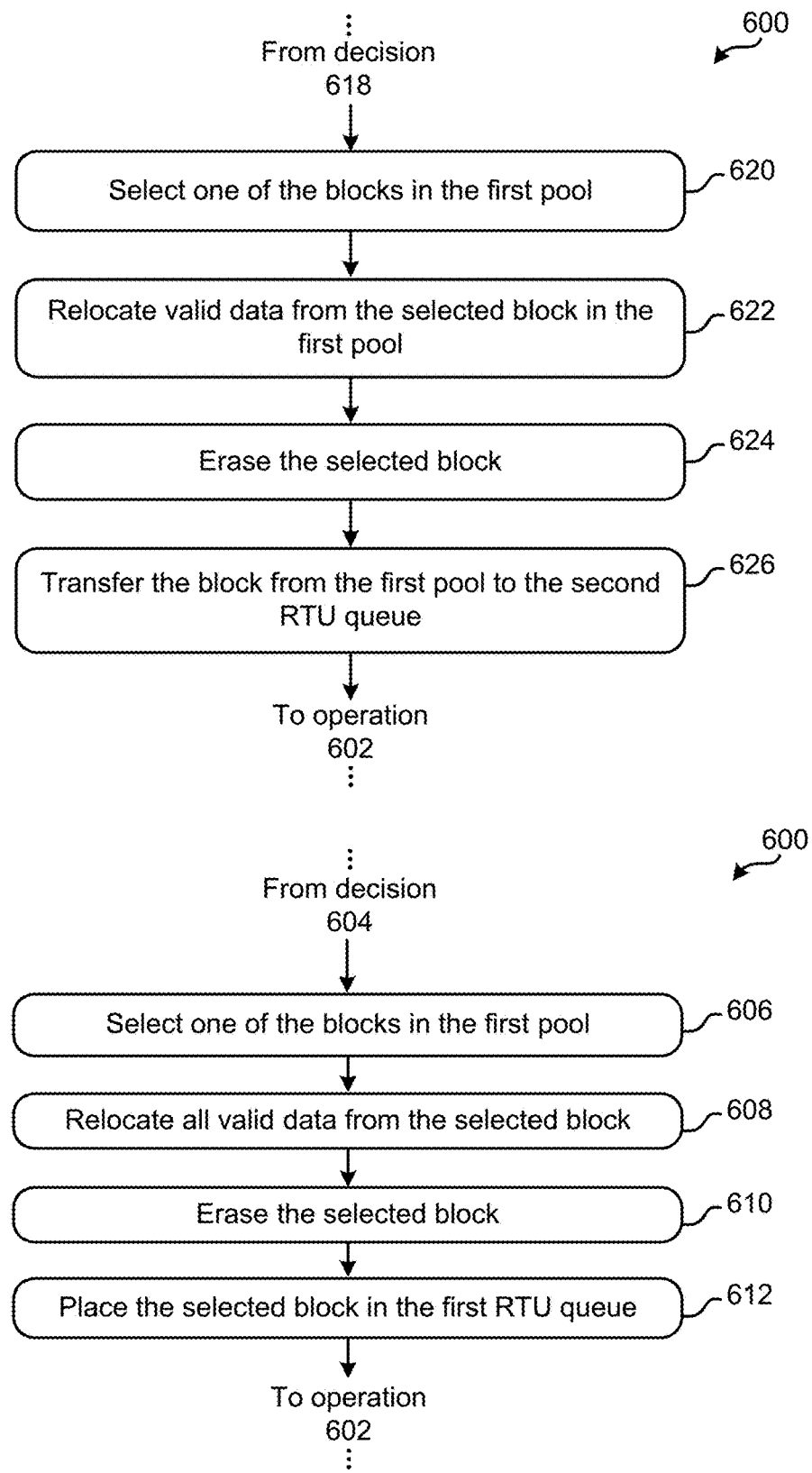

As shown in FIG. 6A, operation 602 of method 600 includes evaluating the size of a first ready-to-use (RTU) queue and the size of a second RTU queue. Each of the first and second RTU queues include memory blocks which are incorporated in first and second pools of memory blocks, respectively. Moreover, each of the first and second pools include memory blocks which are configured in different modes. As mentioned above, the first pool includes memory blocks configured in SLC mode while the second pool includes memory blocks configured in multi-bit-per-cell mode. It follows that the first RTU queue includes memory blocks configured in SLC mode, while the second RTU queue includes memory blocks configured in multi-bit-per-cell mode. Depending on the approach, the blocks in the second pool that are configured in multi-bit-per-cell mode may have a number of different configurations. For instance, in some approaches the blocks in the second pool that are configured in multi-bit-per-cell mode are configured in multi-level cell (MLC) mode, while in other approaches the blocks in the second pool that are configured in multi-bit-per-cell mode are configured in triple-level cell (TLC) mode. In still other approaches, the blocks in the second pool that are configured in multi-bit-per-cell mode are configured in quad-level cell (QLC) mode, and each of the blocks configured in QLC mode include lower pages, upper pages, extra pages, and top pages.

With respect to the present description, the "size" of a given RTU queue is intended to represent the amount of erased memory blocks that are included therein. Initially, when no data is written to the device, the size of an RTU queue represents the overall storage capacity as all blocks are erased and placed in the RTU queue according to their mode. Over time, as data is written to the non-volatile memory module, new LEBs for data placement are opened by taking blocks from the respective RTUs, which reduces their size. At some point, the opening and closing of LEBs results in a low queue level in any of the RTUs at which point garbage collection has to be executed. The size of the RTU may be represented by (e.g., quantified using) a number of blocks included in the RTU queue, the combined storage capacity of the blocks included in the RTU queue, a percentage of the overall number of blocks included in the overarching system that are included in the RTU queue, etc. According to some approaches, the size of the first and/or second RTU queues are evaluated by actually inspecting the queues themselves, retrieving the information from a counter, a lookup table, looking through an operations log, etc.

Moreover, decision 604 includes determining whether a number of blocks included in the first RTU queue is in a first range of the first RTU queue. It follows that this first range is specific to the first RTU queue in preferred approaches. However, in some approaches the first range may be the same or similar for the first RTU queue as well as the second RTU queue. The first RTU queue also preferably corresponds to a garbage collection threshold of the first RTU queue, such that a garbage collection operation is performed in response to determining that the number of blocks included in the first RTU queue is undesirably low. The garbage collection processes will relocate valid data from one or more of the blocks in the first pool such that the one or more blocks may be placed in the first RTU queue, thereby increasing the number of blocks that are included therein, e.g., as will soon become apparent. However, it should be noted that "in a first range" is in no way intended to limit the invention. Rather than determining whether a value is in a given range, equivalent determinations may be made, e.g., as to whether a value is above a predetermined threshold, whether a value is outside a predetermined range, whether an absolute value is above a threshold, whether a value is below a threshold, etc., depending on the desired approach.

As previously mentioned, method 600 proceeds to operation 606 in response to determining that the number of blocks included in the first RTU queue is not in the first range of the first RTU queue. There, operation 606 includes selecting one of the blocks in the first pool, while operation 608 includes relocating all valid data from the selected block. The block selected in operation 606 will undergo a garbage collection process which is initiated in operation 608. It follows that in some approaches, the block having the most invalid data therein of all the blocks in the first pool is selected. However, any other desired factors may be considered in the process of selecting one of the blocks in the first pool to undergo a garbage collection process. For instance, an age of each of the blocks, an amount of valid data included in each of the blocks, etc. may be considered when selecting on the of the blocks in the first pool.

Relocating the valid data from the selected block may further be performed in any desired manner. For instance, the valid data may be temporarily stored in a cache (e.g., see cache memory 510 in FIG. 5) before being stored in a different block of memory in some approaches. In other approaches, the valid data may be transferred to another block of memory directly. In response to relocating the valid data from the selected block, operation 610 includes erasing the selected block.

Proceeding to operation 612, there method 600 includes placing the selected (and now erased) block in the first RTU queue which corresponds to the first pool. As mentioned above, each of the first and second RTU queues include memory blocks which are incorporated in first and second pools of memory blocks, respectively. Accordingly, by performing a garbage collection operation on the selected block and placing it in the first RTU queue, the selected block is effectively used to help fill the first RTU queue. This desirably avoids latency issues by ensuring that a predetermined number of available (e.g., empty) blocks are included in the first RTU queue.

It should also be noted that in some approaches, a block undergoes read threshold voltage shift value recalibration when data is stored in the pages and the block is not yet erased. Accordingly, in some approaches the process of placing the selected (and now erased) block in the first RTU queue involves marking the block for recalibrating the read threshold voltage shift value(s). The read threshold voltage shift value may be recalibrated using any processes which would be apparent to one skilled in the art after reading the present description. For instance, calibrating read threshold voltage shift values may be performed at the time that the pages in the block are actually programmed. Hence, read threshold voltage shift values may not actually be recalibrated directly after the block has been erased. Rather, an erased block which has been marked for read threshold voltage shift value calibration will wait until the block is reprogrammed again in order to perform the calibration.

Referring still to FIG. 6A, method 600 returns to operation 602 from operation 612, e.g., such that the sizes of the first and/or second RTU queues may continue to be monitored. Jumping back to decision 604, the flowchart proceeds to decision 614 in response to determining that the number of blocks included in the first RTU queue is in the first range of the first RTU queue. In other words, method 600 proceeds to decision 614 from decision 604 in response to determining that the first RTU queue includes a desirable number of memory blocks therein. Again, this first range corresponds to the first RTU queue and may be predetermined by a user, based on industry standards, adjusted based on system performance, etc.

Decision 614 includes determining whether the first pool should be decreased in size. In other words, decision 614 determines whether the number of memory blocks included in the first pool is undesirably, or at least unnecessarily high. This determination may be made by comparing a target size of the first pool with the current (e.g., actual) size of the first pool. The number of memory blocks in the first pool includes all blocks in the corresponding mode associated to the first pool, irrespective whether the block is in an open or closed LEB or in the first RTU. The target size of the first pool may be predetermined by a user, specified based on predicted workloads for the overarching system, etc.

In response to determining that the first pool should not be decreased in size, method 600 returns to operation 602, e.g., such that the sizes of the first and/or second RTU queues may continue to be monitored. However, method 600 proceeds from decision 614 to decision 616 in response to determining that the first pool should be decreased in size. There, decision 616 includes determining whether a number of blocks included in a second RTU queue is in a second range of the second RTU queue. It follows that this second range is preferably specific to the second RTU queue. However, it should also be noted that in some approaches the second range may be the same or similar for the first RTU queue as well as the second RTU queue. This second range of the second RTU queue may also correspond to a "boost threshold" in preferred approaches, such that the RTU queue of the target location is evaluated in determining whether to transfer blocks from one pool to another. This desirably ensures that the target location is not overfilled by preventing the transition of blocks between pools even before the target pool has reached its capacity. In other words, even if the first RTU queue and the first pool (e.g., the "source location") are sufficiently filled with memory blocks, the status of the second RTU queue (e.g., the "target location") is also taken into consideration before deciding to offload memory blocks from the first pool. Moreover, the boost threshold can be dynamically adjusted during real time based on a current amount of block transfers involved with the current workload properties. In a preferred embodiment, the boost threshold is above the threshold at which garbage collection is being stopped in that same pool. For some approaches involving the resizing of the block pools, the boost threshold of the target (e.g., "receiving") pool can be decreased proportional with the number of blocks expected to be added. This decrease can be performed either when the boost threshold is increased for the source pool, or after a block has been extracted from the source pool.

Evaluating both the source location as well as the target location is particularly desirable as it avoids unnecessary processing overhead. Specifically, resizing block pools can affect I/O latency and throughput of the overall system. This is at least partially because block transfers can exhaust the blocks in one of the RTU queues, thereby potentially leading to processing delays. Even if the RTU queues are not exhausted, block transfers may lower the free block count in a given pool below a desired level, thereby causing garbage collection operations to be performed more aggressively. The overhead resulting from the additional garbage collection operations would undesirably result in throttling of host operations. Furthermore, changing the configuration or "mode" of a given block causes overhead. For instance, additional controller metadata is updated when switching between block configuration modes. Moreover, the process of relocating valid data from a block being reconfigured and/or recalibrating the threshold voltage shift value(s) of the block introduce additional processing overhead.

It follows that by evaluating the source location as well as the target location before performing a memory block transfer therebetween, the system is able to limit such transfers and thereby desirably avoid unnecessary processing overhead. It should also be noted that "in a second range" is in no way intended to limit the invention. As noted above, rather than determining whether a value is in a given range, equivalent determinations may be made, e.g., as to whether a value is above a predetermined threshold (e.g., the boost threshold), whether a value is outside a predetermined range, whether an absolute value is above a threshold, whether a value is below a threshold, etc., depending on the desired approach.

The resizing of the pools is further intelligently enabled by limiting speed of the resizing to the speed at which blocks are being consumed in the target pool. In other words, the overall overhead is further minimized as the evaluation of the source and target locations facilitate the deferring of the garbage collection of blocks even when the pools have to be resized, thereby maximizing the amount of invalidated data in blocks being selected for garbage collection during resizing, and thus reducing the number of valid pages to be relocated which effectively decreases write amplification.

Referring still to FIG. 6A, method 600 returns to operation 602 from decision 616 in response to determining that the number of blocks included in the second RTU queue is in the second range of the second RTU queue. As mentioned above, this allows for method 600 to continue monitoring the sizes of the first and/or second RTU queues. Method 600 alternatively proceeds to decision 618 in response to determining that the number of blocks included in the second RTU queue is not in the second range of the second RTU queue.

Proceeding to decision 618, there method 600 includes determining whether a current input/output (I/O) workload experienced by the storage system is in a third range. As alluded to above, the process of transferring memory blocks between pools is a workload intensive process which may thereby have an impact on performance of the overarching system. Accordingly, by evaluating the current I/O workload of the storage system in determining if and/or when to transfer a memory block between pools, method 600 is able to target low I/O workloads and reduce the resulting processing impact. Once again "in a third range" is in no way intended to limit the invention. As noted above, rather than determining whether a value is in a given range, equivalent determinations may be made, e.g., as to whether a value is above a predetermined threshold, whether a value is outside a predetermined range, whether an absolute value is above a threshold, whether a value is below a threshold, etc., depending on the desired approach. Also note that the outcome of the decision 618 may be decided deterministically or probabilistically. Hence, determining whether a value is in a given range may also include whether the value is with a certain probability in the given range and the decision taken may be based on the probability.

Method 600 returns to operation 602 in response to determining that the current I/O workload experienced by the storage system is in the third range. In other words, method 600 proceeds to operation 620 in response to determining that the current I/O workload of the storage system is undesirably high. However, method 600 proceeds to operation 620 in response to determining that the current I/O workload experienced by the storage system is not in the third range. There, operation 620 includes selecting one of the blocks in the first pool. The block selected in operation 620 will undergo a garbage collection process. It follows that in some approaches, the block having the most invalid data therein of all the blocks in the first pool is selected. However, any other desired factors may be considered in the process of selecting one of the blocks in the first pool to undergo a garbage collection process. For instance, an age of each of the blocks, an amount of valid data included in each of the blocks, whether a given block is eligible to be transferred, etc. may be considered when selecting on the of the blocks in the first pool.

Operation 622 further includes relocating valid data from the selected block in the first pool. Relocating the valid data from the selected block may be performed in any desired manner depending on the approach. For instance, the valid data may be temporarily stored in a cache (e.g., see cache memory 510 in FIG. 5) before being stored in a different block of memory in some approaches. In other approaches, the valid data may be transferred to another block of memory directly. In response to relocating the valid data from the selected block, operation 624 includes erasing the selected block.

Furthermore, operation 626 includes transferring the block from the first pool to the second RTU queue which corresponds to the second pool. According to the present description, a block that is "transferred" between RTU queues and/or pools remains in a same plane and channel of memory (e.g., see FIG. 4). In other words, while the functional characteristics of the given block may change as a result of activating and/or deactivating certain bits in each of the cells therein, the blocks themselves do not physically move in the memory. Rather, the blocks are "transferred" between RTU queues and/or pools in a logical sense. In some approaches these transfers are indicated in an LPT, a block status table, an operations log, etc.

Again, the first pool (along with the first RTU queue) includes memory blocks configured in SLC mode while the second pool (along with the second RTU queue) includes memory blocks configured in multi-bit-per-cell mode. Therefore, because each of the first and second pools include memory blocks which are configured in different modes, the process of actually transferring the selected block in operation 626 involves reconfiguring the block. Referring momentarily to FIG. 6C, exemplary sub-processes of transferring a given block between the first pool and the second RTU queue are illustrated in accordance with one embodiment, one or more of which may be used to perform operation 626 of FIG. 6A and/or operation 656 of FIG. 6B below. However, it should be noted that the sub-processes of FIG. 6C are illustrated in accordance with one embodiment which is in no way intended to limit the invention.

As shown, the flowchart in FIG. 6C includes reconfiguring the selected block. See sub-operation 670. Depending on whether the selected block is being transferred from the first pool to the second RTU queue or the second pool to the first RTU queue, the process of reconfiguring the block of memory may be performed differently. For instance, blocks being transferred from the first pool to the second RTU queue are preferably reconfigured from SLC mode to multi-bit-per-cell mode. However, blocks which are being transferred from the second pool to the first RTU queue are preferably reconfigured from multi-bit-per-cell mode to SLC mode. The process of reconfiguring a given block between SLC and multi-bit-per-cell mode may be performed by deactivating and/or reactivating certain ones of the bits included in the block, logically redefining the given block, etc., or using any processes which would be apparent to one skilled in the art after reading the present description.

Recalibrating a block has an effect on the performance of the block. For instance, the read threshold voltage shift values associated with accessing the given block in the second pool may have changed as a result of the block being used in the first pool. Accordingly, the flowchart also includes marking the block for recalibration of the read threshold voltage shift values in the target mode once the block is being programmed again. See sub-operation 672. The read threshold voltage shift values may be recalibrated using any processes which would be apparent to one skilled in the art after reading the present description. However, in some approaches, the read threshold voltage shift values may be accessed from memory (e.g., a lookup table), be predefined, dynamically adjusted on the fly, etc. Moreover, sub-operation 672 includes recalibrating one or more read threshold voltage shift values for each active bit in the given block in some approaches.

Referring back to FIG. 6A, method 600 returns to operation 602 from operation 626, e.g., such that the sizes of the first and/or second RTU queues may continue to be monitored. It follows that method 600 is able to successfully adapt block pool sizes in real time while also maintaining efficient performance of the overarching storage system.

As previously mentioned, one or more of the various processes included in method 600 may be applied in the context of transitioning memory blocks configured in multi-bit-per-cell mode to being configured in SLC mode. Accordingly, looking now to FIG. 6B, a method 630 for adapting block pool sizes in a storage system is shown according to another embodiment. The method 630 may be performed in accordance with the present invention in any of the environments depicted in FIGS. 1-6A, among others, in various embodiments. Of course, more or less operations than those specifically described in FIG. 6B may be included in method 630, as would be understood by one of skill in the art upon reading the present descriptions. For instance, the various processes included in method 630 are described below in the context of transitioning memory blocks configured in multi-bit-per-cell mode to being configured in SLC mode. It follows that any one or more of the approaches described above with respect to method 600 of FIG. 6A may be implemented in method 630 as desired.

Each of the steps of the method 630 may also be performed by any suitable component of the operating environment. For example, in various embodiments, the method 630 may be partially or entirely performed by a hybrid controller, a controller, a processor, a computer, etc., or some other device having one or more processors therein. Thus, in some embodiments, method 630 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 630. Illustrative processors include, but are not limited to, a central processing unit (CPU), an application specific integrated circuit (ASIC), a field programmable gate array (FPGA), etc., combinations thereof, or any other suitable computing device known in the art.

Figure 6B:
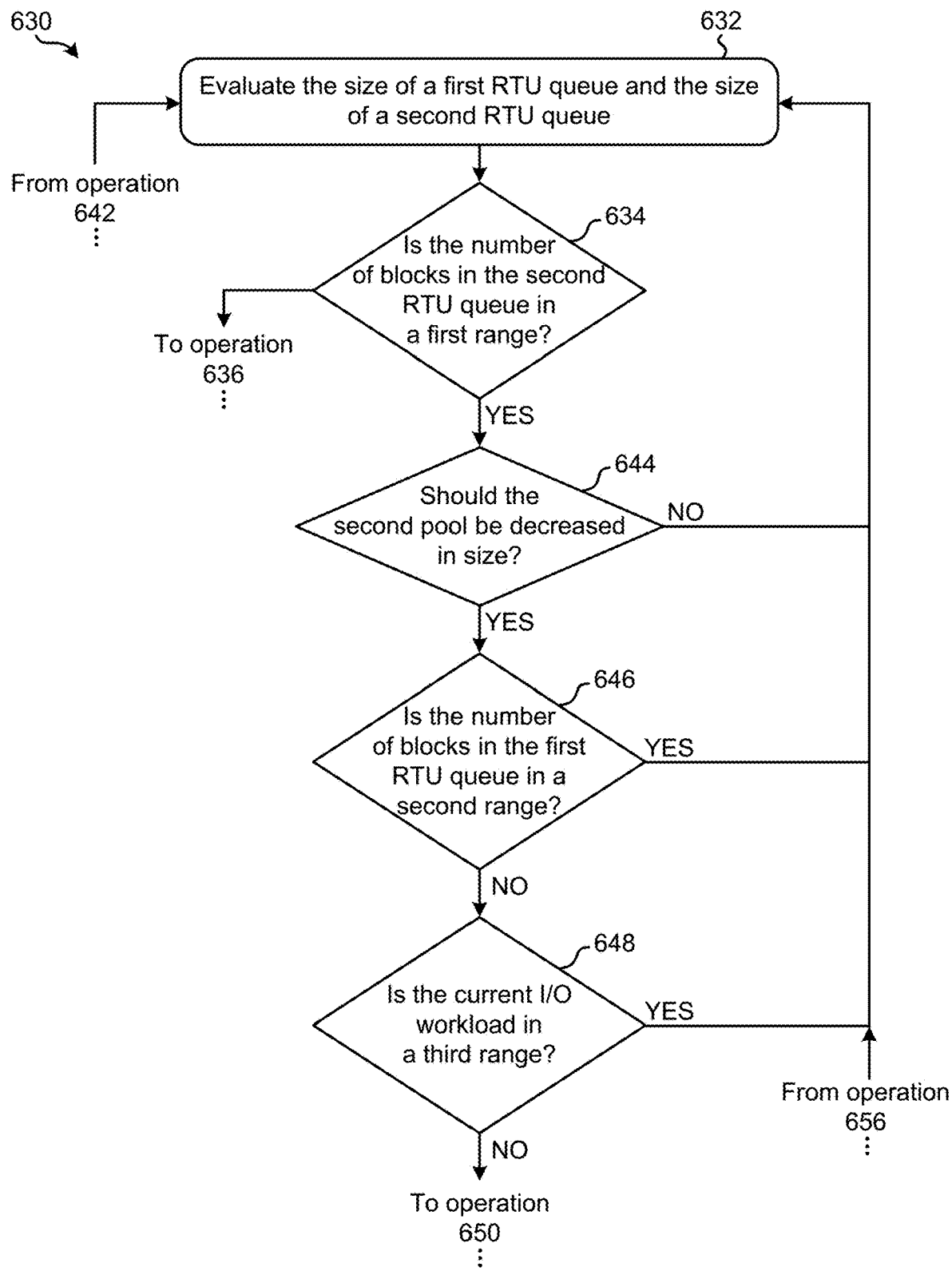
FIG. 6B is a flowchart of a method, in accordance with one embodiment.
Figure 6B:
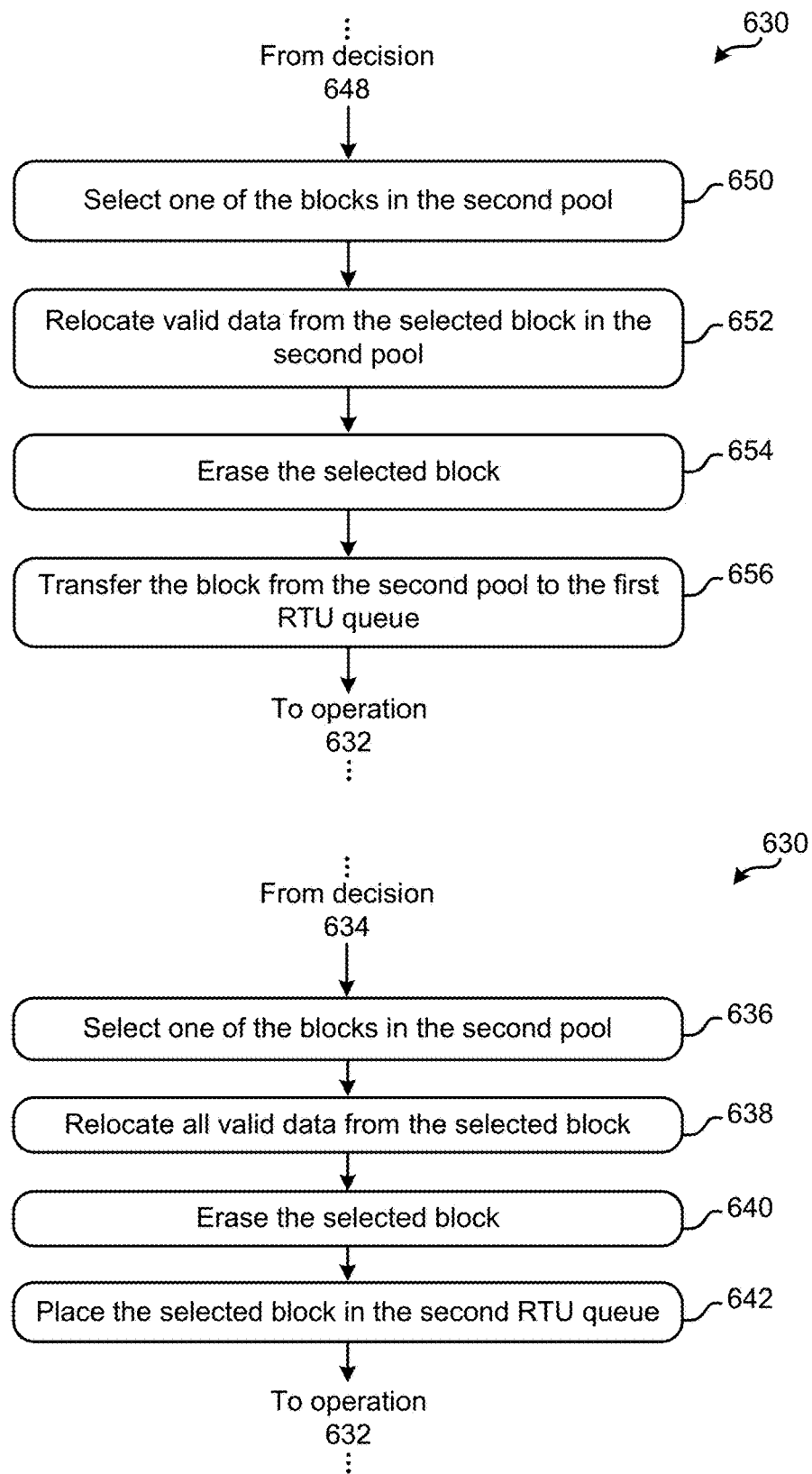
Figure 6C:
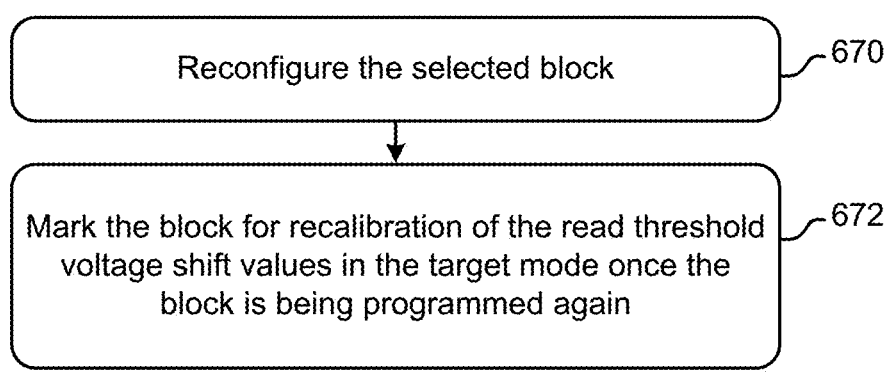
FIG. 6C is a flowchart of sub-processes for one of the operations in the method of FIG. 6A and/or FIG. 6B, in accordance with one embodiment.

As shown in FIG. 6B, operation 632 of method 630 includes evaluating the size of a first ready-to-use (RTU) queue and the size of a second RTU queue. Each of the first and second RTU queues include memory blocks which are incorporated in first and second pools of memory blocks, respectively. Moreover, each of the first and second pools include memory blocks which are configured in different modes. As mentioned above, the first pool includes memory blocks configured in SLC mode while the second pool includes memory blocks configured in multi-bit-per-cell mode. It follows that the first RTU queue includes memory blocks configured in SLC mode, while the second RTU queue includes memory blocks configured in multi-bit-per-cell mode.

Again, with respect to the present description, the "size" of a given RTU queue is intended to represent the amount of erased memory blocks that are included therein. The size of an RTU queue thereby represents the overall storage capacity of the given RTU queue, and may be represented by (e.g., quantified using) a number of blocks included in the RTU queue, the combined storage capacity of the blocks included in the RTU queue, a percentage of the overall number of blocks included in the overarching system that are included in the RTU queue, etc. According to some approaches, the size of the first and/or second RTU queues are evaluated by actually inspecting the queues themselves, retrieving the information from a lookup table, looking through an operations log, etc.

Moreover, decision 634 includes determining whether a number of blocks included in the second RTU queue is in a first range of the second RTU queue. As noted above, this first range corresponds to a garbage collection threshold in preferred approaches, such that a garbage collection operation is performed in response to determining that the number of blocks included in the second RTU queue is undesirably low. Note that this first range is associated to the second RTU and may be the same or different than the first range associated to the first RTU introduced in method 600, e.g., as would be appreciated by one skilled in the art upon reading the present description.

Method 600 proceeds to operation 636 in response to determining that the number of blocks included in the second RTU queue is not in the first range of the second RTU queue. There, operation 636 includes selecting one of the blocks in the second pool, while operation 638 includes relocating all valid data from the selected block. The block selected in operation 636 will undergo a garbage collection process which is initiated in operation 638. It follows that in some approaches, the block having the most invalid data therein of all the blocks in the second pool is selected. However, any other desired factors may be considered in the process of selecting one of the blocks in the second pool to undergo a garbage collection process.

In response to relocating the valid data from the selected block, operation 640 includes erasing the selected block. Proceeding to operation 642, there method 630 includes placing the selected (and now erased) block in the second RTU queue which corresponds to the second pool. It should also be noted that in some approaches, a block undergoes read threshold voltage shift value recalibration when data is stored in the pages and the block is not yet erased. Accordingly, in some approaches the process of placing the selected (and now erased) block in the second RTU queue involves marking the block for recalibrating the read threshold voltage shift value(s), e.g., using any processes which would be apparent to one skilled in the art after reading the present description.

Referring still to FIG. 6B, method 630 returns to operation 632 from operation 642, e.g., such that the sizes of the first and/or second RTU queues may continue to be monitored. Jumping back to decision 634, the flowchart proceeds to decision 644 in response to determining that the number of blocks included in the second RTU queue is in the first range of the second RTU queue. There, decision 644 includes determining whether the second pool should be decreased in size. In other words, decision 644 determines whether the number of memory blocks included in the second pool is undesirably, or at least unnecessarily high. This determination may be made by comparing a target size of the second pool with the current (e.g., actual) size of the second pool.

In response to determining that the second pool should not be decreased in size, method 630 returns to operation 632, e.g., such that the sizes of the first and/or second RTU queues may continue to be monitored. However, method 630 proceeds from decision 644 to decision 646 in response to determining that the second pool should be decreased in size. There, decision 646 includes determining whether a number of blocks included in a first RTU queue is in a second range of the first RTU queue. This second range of the first RTU queue is associated with the first RTU queue itself and corresponds to a "boost threshold" in preferred approaches, such that the RTU queue of the target location is evaluated in determining whether to transfer blocks from one pool to another. In other words, even if the second RTU queue and the second pool (e.g., the "source location") are sufficiently filled with memory blocks, the status of the first RTU queue (e.g., the "target location") is also taken into consideration before deciding to offload memory blocks from the second pool which is particularly desirable for those reasons discussed above. Note that this second range is associated to the first RTU and may be the same or different than the second range associated to the second RTU introduced in method 600, e.g., as would be appreciated by one skilled in the art upon reading the present description.

Referring still to FIG. 6B, method 630 returns to operation 632 from decision 646 in response to determining that the number of blocks included in the first RTU queue is in the second range of the first RTU queue. As mentioned above, this allows for method 630 to continue monitoring the sizes of the first and/or second RTU queues. Method 630 alternatively proceeds to decision 648 in response to determining that the number of blocks included in the first RTU queue is not in the second range of the first RTU queue. There, decision 648 includes determining whether a current I/O workload experienced by the storage system is in the third range. As alluded to above, the process of transferring memory blocks between pools is a workload intensive process which may thereby have an impact on performance of the overarching system. Accordingly, by evaluating the current I/O workload of the storage system in determining if and/or when to transfer a memory block between pools, method 630 is able to target low I/O workloads and reduce the resulting processing impact.

Method 630 returns to operation 632 in response to determining that the current I/O workload experienced by the storage system is in the third range. Alternatively, method 630 proceeds to operation 650 in response to determining that the current I/O workload experienced by the storage system is not in the third range. There, operation 650 includes selecting one of the blocks in the second pool. The block selected in operation 650 will undergo a garbage collection process. It follows that in some approaches, the block having the most invalid data therein of all the blocks in the first pool is selected. However, any other desired factors may be considered in the process of selecting one of the blocks in the first pool to undergo a garbage collection process.

Operation 652 further includes relocating valid data from the selected block in the second pool. In response to relocating the valid data from the selected block, operation 654 includes erasing the selected block. Proceeding to decision 656, there method 630 includes transferring the block from the second pool to the first RTU queue which corresponds to the first pool. Again, a block that is "transferred" between RTU queues and/or pools remains in a same plane and channel of memory (e.g., see FIG. 4). In other words, while the functional characteristics of the given block may change as a result of activating and/or deactivating certain bits in each of the cells therein, the blocks themselves do not physically move in the memory. Rather, the blocks are "transferred" between RTU queues and/or pools in a logical sense. In some approaches these transfers are indicated in an LPT, a block status table, an operations log, etc.

Again, the second pool (along with the second RTU queue) includes memory blocks configured in multi-bit-per-cell mode while the first pool (along with the first RTU queue) includes memory blocks configured in SLC mode. Therefore, because each of the first and second pools include memory blocks which are configured in different modes, the process of actually transferring the selected block in operation 656 involves reconfiguring the block. Referring momentarily to FIG. 6C again, any of the sub-processes and/or specific approaches described for transferring a given block between a pool and an RTU queue may be used to perform operation 656 of FIG. 6B.

Referring back to FIG. 6B, method 630 returns to operation 632 from operation 656, e.g., such that the sizes of the first and/or second RTU queues may continue to be monitored. Accordingly, method 630 is also able to successfully adapt block pool sizes in real time while also maintaining efficient performance of the overarching storage system.

Figure 7:
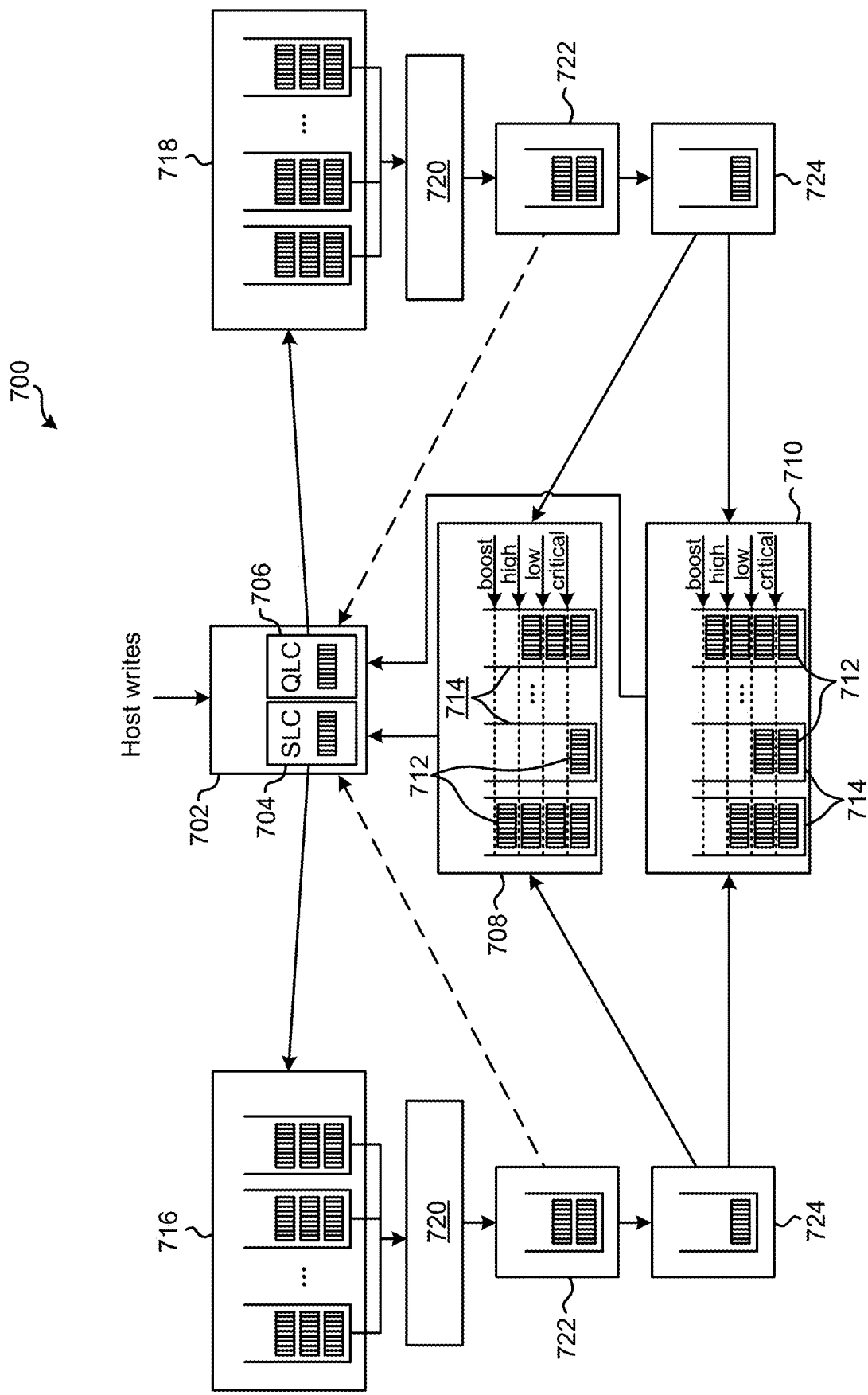
FIG. 7 is a partial representational view of a data and block flow overview, in accordance with one embodiment.

Referring now to FIG. 7, a data and block flow overview 700 is illustrated in accordance with one embodiment. As an option, the present data and block flow overview 700 may be implemented in conjunction with features from any other embodiment listed herein, such as those described with reference to the other FIGS., such as FIGS. 6A-6C. However, such data and block flow overview 700 and others presented herein may be used in various applications and/or in permutations which may or may not be specifically described in the illustrative embodiments listed herein. Further, the data and block flow overview 700 presented herein may be used in any desired environment. Thus FIG. 7 (and the other FIGS.) may be deemed to include any possible permutation.

As shown, host writes are received by a data placement module 702 which includes a LEB 704 consisting of one or more blocks of memory that is configured in SLC mode as well as a LEB 706 consisting of one or more blocks of memory configured in multi-bit-per-cell mode. New data is first written to LEBs with blocks configured in SLC mode in some approaches, thereby allowing for the new data to benefit from the lower latencies and higher throughput associated with blocks in SLC mode (e.g., compared to blocks configured in multi-bit-per-cell mode). However, in situations involving high host and internal write loads, new data may be stored directly in blocks that are configured in multi-bit-per-cell mode. Blocks configured in SLC mode are received from a first set of RTU queues 708, while blocks configured in multi-bit-per-cell mode are received from a second set of RTU queues 710. Each of the first and second set of RTU queues 708, 710 include a plurality of memory blocks 712, each of which are accumulated in RTU queues for different planes and channels 714, e.g., as would be appreciated by one skilled in the art after reading the present description.

Each of the RTU queues 714 associated to a plane and channel and being included in the first and second set of RTU queues 708, 710 are depicted as having a number of different thresholds which correspond to the number of memory blocks that are included in the respective RTU queue 714. One of these thresholds is a boost threshold which corresponds to either of the second ranges as described above (e.g., see decisions 616 and 646). This "boost" threshold is thereby used in some approaches to determine whether the respective RTU queue and/or specific channel have an undesirably low number of memory blocks included therein. "High", "low", and "critical" thresholds are also implemented in the present embodiment, each of which signify a different fill level for the respective channels in the first and second set of RTU queues 708, 710.

In response to filling a given block or memory with data at the data placement module 702, the LEB is transferred to the respective one of the occupied block queues. Specifically, the LEBs configured in SLC mode are transferred to the SLC occupied block queues 716, while the LEBs configured in multi-bit-per-cell mode are transferred to the multi-bit-per-cell occupied block queues 718. The number of LEBs included in each of the queues 716, 718 changes over time. Therefore, the amount of information stored in (e.g., the effective size of) each of the queues 716, 718 also varies over time.

Over time, LEBs are eventually transitioned from the queues 716, 718 to the garbage collector and wear leveler modules 720. In some approaches, the LEBs are progressed to the garbage collector and wear leveler modules 720 according to standard garbage collection procedures. For example, as data in the blocks of a LEB is invalidated over time (e.g., due to rewrite operations, deletions, etc.), the LEB may be specified for garbage collection. However, in other approaches LEBs may be selected and processed by the garbage collector and wear leveler modules 720 according to any of the processes described above with respect to FIGS. 6A-6C. In some embodiments, LEBs may be further selected by the garbage collector or wear leveler based on the retention time or the number of reads the blocks in the LEB have seen, or the measured RBER.

From the garbage collector and wear leveler modules 720, LEBs advance to the data relocation module 722 which sends any valid data extracted from the blocks in the LEB back to the data placement module 702 (as represented by the dashed, arrowed lines). Accordingly, the data may be stored in another available LEB of memory. The blocks in the LEB are thereafter erased by the block erase modules 724. The erase operation may involve specifying the target mode of the block.

Depending on the specified target block mode, erased blocks are either returned to the RTU queue which corresponds to the current mode in which the block is configured, or the blocks are reconfigured. For example, an empty block configured in SLC mode is either returned to an RTU 714 in the first set of RTU queues 708, or reconfigured in multi-bit-per-cell mode before being placed in an RTU 714 in the second set of RTU queues 710. Similarly, an empty block configured in in multi-bit-per-cell mode is either returned to an RTU 714 in the second set of RTU queues 710, or reconfigured in SLC mode before being placed in an RTU 714 in the first set of RTU queue 708. Accordingly, each of the block erase modules 724 are depicted as having two arrowed lines extending therefrom, each of these lines representing the possible paths of the blocks that are erased therein. This determination of whether to return a memory block to a matching RTU queue or reconfigure the block before adding it to a different RTU queue may be made based on any of the processes included in FIGS. 6A-6C as mentioned above. Further, the reconfiguration of a block may include the updating of a block status table.

It follows that various ones of the embodiments included herein are able to successfully adapt block pool sizes in real time while also maintaining efficient performance of the overarching storage system. Efficiency of the system is maintained by ensuring that a pool being shrunk does not experience a lack of memory blocks as a result of the resizing, ensuring that the pool being enlarged does not hold too many erased blocks in the RTUs, ensuring that write amplification in the source pool does not increase significantly, and ensuring that a block being transferred is eligible for transfer. These pool resizing operations are further performed in the background, thereby not having any effects on host I/O latency and throughput as would be appreciated by one skilled in the art after reading the present description.

Some of the embodiments included herein are also able to avoid situations in which blocks are switched from a given pool when that pool is under pressure for clean (e.g., empty) blocks to field data writes and/or relocations. Performance is further improved by taking advantage of periods involving low I/O loads. As a result, when the system is underutilized, block transfers between the pools may be performed in the background without impacting nominal performance of the system. Further still, evaluating both the source location as well as the target location is particularly desirable when determining whether to transfer blocks between pools, as it avoids unnecessary processing overhead. This also ensures that the source pool is sufficiently replenished before blocks are transitioned to another pool.

It should also be noted that although various ones of the approaches have been described herein in the context of two memory block pools, any of these approaches may be extended to embodiments having more than two block pools. In such embodiments, the target pool can be determined using priorities, based on user input, by comparing the RTU block levels of each respective pool and selecting the pool that has the lowest number of RTU blocks, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 8:
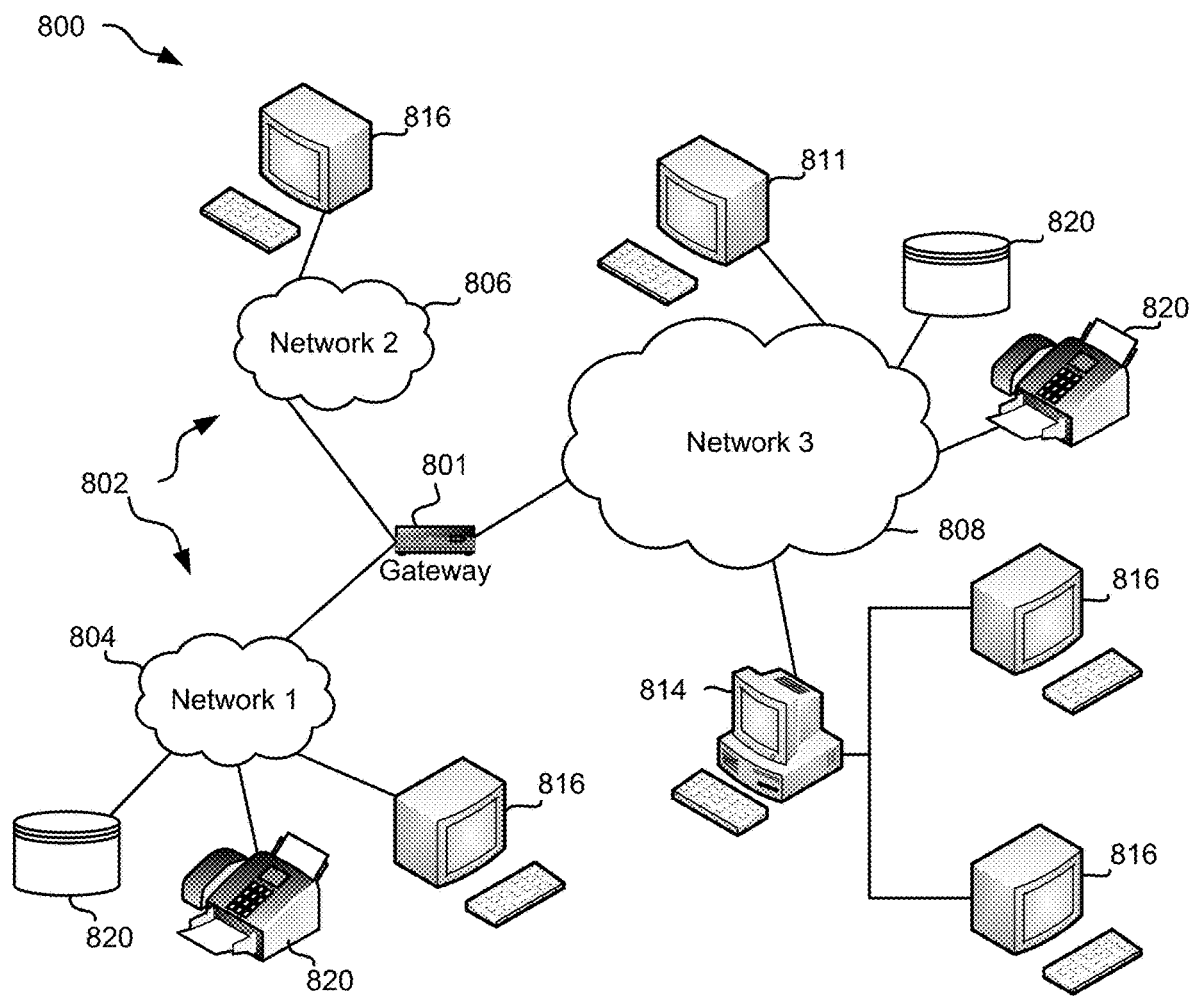
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
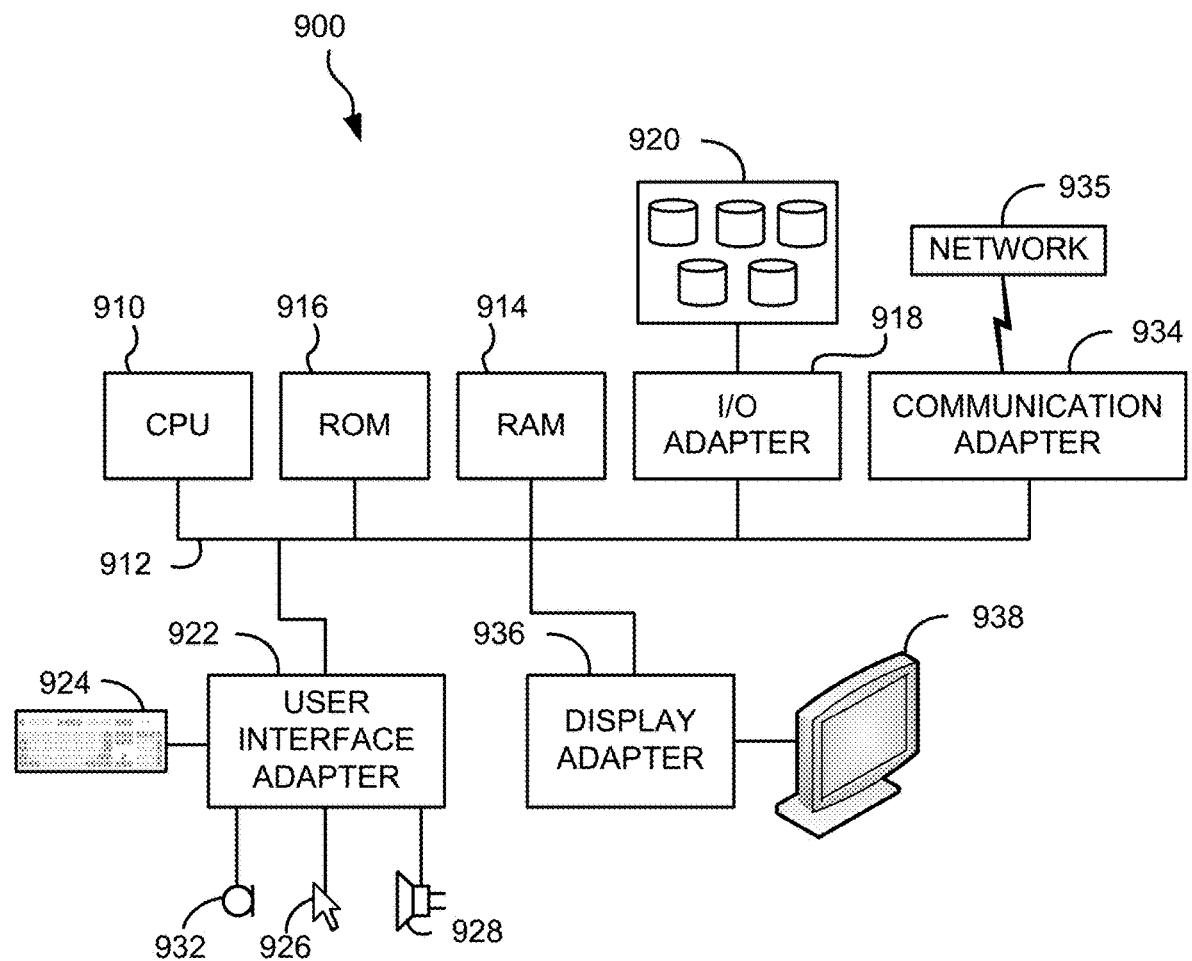
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
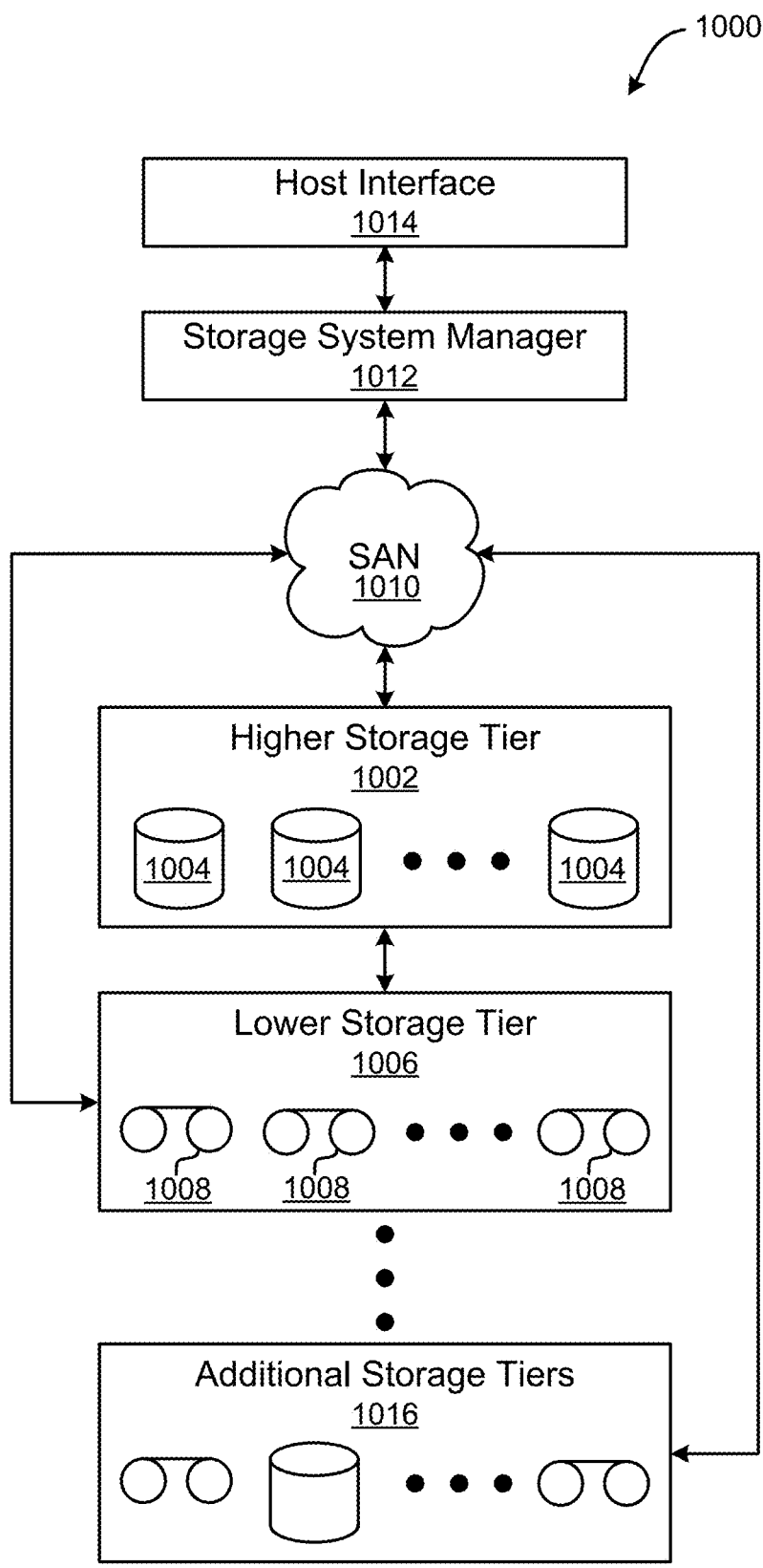
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager

1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

It will be clear that the various features of the foregoing systems and/or methodologies may be combined in any way, creating a plurality of combinations from the descriptions presented above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for adapting block pool sizes in a storage system, comprising:

determining whether a number of blocks included in a first ready-to-use (RTU) queue is in a first range of the first RTU queue;

in response to determining that the number of blocks included in the first RTU queue is in the first range of the first RTU queue, determining whether a number of blocks included in a second RTU queue is in a second range of the second RTU queue;

in response to determining that the number of blocks included in the second RTU queue is not in the second range of the second RTU queue, relocating valid data from one of the blocks in a first pool which corresponds to the first RTU queue;

erasing the block in the first pool; and transferring the block from the first pool to the second RTU queue which corresponds to a second pool, wherein the blocks in the first pool are configured in single-level cell (SLC) mode, wherein the blocks in the second pool are configured in multi-bit-per-cell mode.

2. The computer-implemented method of claim 1, wherein transferring the block from the first pool to the second RTU queue which corresponds to the second pool includes:

reconfiguring the block from SLC mode to multi-bit-per-cell mode; and marking the reconfigured block for recalibration of a read threshold voltage shift value thereof.

3. The computer-implemented method of claim 1, comprising:

determining whether a current input/output (I/O) workload experienced by the storage system is in a third range; and transferring the block from the first pool to the second RTU queue which corresponds to the second pool in response to determining that the current I/O workload experienced by the storage system is not in the third range.

4. The computer-implemented method of claim 1, wherein the blocks in the second pool that are configured in multi-bit-per-cell mode are configured in quad-level cell (QLC) mode.

5. The computer-implemented method of claim 1, comprising:

in response to determining that the number of blocks included in the first RTU queue is not in the first range, selecting one of the blocks in the first pool;

relocating valid data from the selected block;

erasing the selected block; and placing the selected block in the first RTU queue corresponding to the first pool.

6. The computer-implemented method of claim 5, wherein placing the selected block in the first RTU queue corresponding to the first pool includes:

marking the selected block for recalibration of a read threshold voltage shift value thereof.

7. The computer-implemented method of claim 1, comprising:

determining whether a number of blocks included in the second RTU queue is in a first range of the second RTU queue;

in response to determining that the number of blocks included in the second RTU queue is in the first range of the second RTU queue, determining whether a number of blocks included in the first RTU queue is in a second range of the first RTU queue;

in response to determining that the number of blocks included in the first RTU queue is not in the second range of the first RTU queue, relocating valid data from one of the blocks in the second pool;
erasing the block in the second pool; and
transferring the block from the second pool to the first RTU queue which corresponds to the first pool.

8. The computer-implemented method of claim 7, wherein transferring the block from the second pool to the first RTU queue which corresponds to the first pool includes:
reconfiguring the block from multi-bit-per-cell mode to SLC mode; and
marking the reconfigured block for recalibration of a threshold voltage shift value thereof.

9. A computer program product comprising a computer readable storage medium having program instructions embodied therewith, the program instructions readable and/or executable by a processor to cause the processor to:
determine, by the processor, whether a number of blocks included in a first ready-to-use (RTU) queue is in a first range of the first RTU queue, wherein the first RTU queue corresponds to a first pool;
in response to determining that the number of blocks included in the first RTU queue is in the first range of the first RTU queue, determine, by the processor, whether a number of blocks included in a second RTU queue is in a second range of the second RTU queue, wherein the second RTU queue corresponds to a second pool;
in response to determining that the number of blocks included in the second RTU queue is not in the second range of the second RTU queue, relocate, by the processor, valid data from one of the blocks in the first pool which corresponds to the first RTU queue;
erase, by the processor, the block in the first pool; and
transfer, by the processor, the block from the first pool to the second RTU queue which corresponds to the second pool,
wherein the blocks in the first pool are configured in single-level cell (SLC) mode,
wherein the blocks in the second pool are configured in multi-bit-per-cell mode.

10. The computer program product of claim 9, wherein transferring the block from the first pool to the second RTU queue which corresponds to the second pool includes:
reconfiguring the block from SLC mode to multi-bit-per-cell mode; and
marking the reconfigured block for recalibration of a threshold voltage shift value thereof.

11. The computer program product of claim 9, the program instructions readable and/or executable by the processor to cause the processor to:
determine, by the processor, whether a current input/output (I/O) workload experienced by a storage system is in a third range; and
transfer, by the processor, the block from the first pool to the second RTU queue which corresponds to the second pool in response to determining that the current I/O workload experienced by the storage system is not in the third range.

12. The computer program product of claim 9, wherein the blocks in the second pool that are configured in multi-bit-per-cell mode are configured in quad-level cell (QLC) mode.

13. The computer program product of claim 9, the program instructions readable and/or executable by the processor to cause the processor to:

in response to determining that the number of blocks included in the first RTU queue is not in the first range of the first RTU queue, select, by the processor, one of the blocks in the first pool;
relocate, by the processor, valid data from the selected block;
erase, by the processor, the selected block; and
place, by the processor, the selected block in the first RTU queue corresponding to the first pool.

14. The computer program product of claim 13, wherein placing the selected block in the first RTU queue corresponding to the first pool includes:
marking the reconfigured selected block for recalibration of a threshold voltage shift value thereof.

15. The computer program product of claim 9, the program instructions readable and/or executable by the processor to cause the processor to:
determine, by the processor, whether a number of blocks included in the second RTU queue is in a first range of the second RTU queue;
in response to determining that the number of blocks included in the second RTU queue is in the first range of the second RTU queue, determine, by the processor, whether a number of blocks included in the first RTU queue is in a second range of the first RTU queue;
in response to determining that the number of blocks included in the first RTU queue is not in the second range of the first RTU queue, relocate, by the processor, valid data from one of the blocks in the second pool;
erase, by the processor, the block in the second pool; and
transfer, by the processor, the block from the second pool to the first RTU queue which corresponds to the first pool.

16. The computer program product of claim 15, wherein transferring the block from the second pool to the first RTU queue which corresponds to the first pool includes:
reconfigure, by the processor, the block from multi-bit-per-cell mode to SLC mode; and
mark, by the processor, the reconfigured block for recalibration of a threshold voltage shift value thereof.

17. A system, comprising:
a plurality of non-volatile random access memory (NVRAM) blocks configured to store data; and
a processor and logic integrated with and/or executable by the processor, the logic being configured to:
determine, by the processor, whether a number of blocks included in a first ready-to-use (RTU) queue is in a first range of the first RTU queue, wherein the first RTU queue corresponds to a first pool;
in response to determining that the number of blocks included in the first RTU queue is in the first range of the first RTU queue, determine, by the processor, whether a number of blocks included in a second RTU queue is in a second range of the second RTU queue, wherein the second RTU queue corresponds to a second pool;
in response to determining that the number of blocks included in the second RTU queue is not in the second range of the second RTU queue, relocate, by the processor, valid data from one of the blocks in the first pool which corresponds to the first RTU queue;
erase, by the processor, the block in the first pool; and
transfer, by the processor, the block from the first pool to the second RTU queue which corresponds to the second pool by: reconfiguring the block from SLC mode to multi-bit-per-cell mode, wherein the blocks in the first pool are configured in single-level cell (SLC) mode, wherein the blocks in the second pool are configured in multi-bit-per-cell mode.

18. The system of claim 17, wherein transferring the block from the first pool to the second RTU queue which corresponds to the second pool includes:

marking the reconfigured block for recalibration of a threshold voltage shift value for the reconfigured block.

19. The system of claim 17, the logic being configured to:

determine, by the processor, whether a current input/output (I/O) workload experienced by a storage system is in a third range; and transfer, by the processor, the block from the first pool to the second RTU queue which corresponds to the second pool in response to determining that the current I/O workload experienced by the storage system is not in the third range.

20. The system of claim 17, the logic being configured to:

determine, by the processor, whether a number of blocks included in the second RTU queue is in a first range of the second RTU queue;

in response to determining that the number of blocks included in the second RTU queue is in the first range of the second RTU queue, determine, by the processor, whether a number of blocks included in the first RTU queue is in a second range of the first RTU queue;

in response to determining that the number of blocks included in the first RTU queue is not in the second range of the first RTU queue, relocate, by the processor, valid data from one of the blocks in the second pool;

erase, by the processor, the block in the second pool; and transfer, by the processor, the block from the second pool to the first RTU queue which corresponds to the first pool.

* * * * *